June 13, 1967 W. E. GLENN, JR 3,325,789

RELIABILITY INFORMATION STORAGE AND READOUT UTILIZING A PLURALITY OF OPTICAL STORAGE MEDIUM LOCATIONS

Filed Dec. 26, 1963 3 Sheets-Sheet 1

Inventor:
William E. Glenn, Jr.,
by John P. DeMott
His Attorney.

June 13, 1967 W. E. GLENN, JR 3,325,789

RELIABILITY INFORMATION STORAGE AND READOUT UTILIZING
A PLURALITY OF OPTICAL STORAGE MEDIUM LOCATIONS

Filed Dec. 26, 1963 3 Sheets-Sheet 2

Inventor:
William E. Glenn, Jr.,
by John P. DeWitt
His Attorney.

Inventor :
William E. Glenn, Jr.,
by John P. Dellitt
His Attorney.

United States Patent Office 3,325,789

Patented June 13, 1967

3,325,789

RELIABILITY INFORMATION STORAGE AND READOUT UTILIZING A PLURALITY OF OPTICAL STORAGE MEDIUM LOCATIONS

William E. Glenn, Jr., Scotia, N.Y., assignor to General Electric Company, a corporation of New York Filed Dec. 26, 1963, Ser. No. 333,312
7 Claims. (Cl. 340—173)

This invention relates to an information storage system and particularly to an information system storing intelligence at a multiplicity of light controlling areas located in an optical medium.

My copending application Ser. No. 783,558, filed Dec. 29, 1958, and entitled, "Information Storage System," now abandoned in favor of continuation-in-part application Ser. No. 472,749, filed June 11, 1965 now Patent No. 3,281,798, dated Oct. 25, 1966, sets forth and claims an information storage system wherein small light controlling deformations in an optical medium represent the intelligence stored. In the system disclosed, the intelligence is transcribed electronically with an electron beam which deposits electrical charge on the optical medium. Areas of deposited charge depress the medium because the charge becomes attracted towards a conductive material contained within the medium. With this type of recording system, a high degree of packing density of storage is possible inasmuch as the charge deposits and the resulting deformation may be described as microscopic in size.

In accordance with the invention of my above-mentioned application, the deformation patern in the optical medium is "read out" by illuminating the deformation pattern. Deformations in the optical medium deflect or diffract the light presented. Only the deflected light is detected since a light masking system is arranged to block undeflected light and pass only the light representing the intelligence as originally recorded in the optical medium. While the high concentration of stored information can be stored and read out in this manner, it is desired to improve the general reliability of the system, specifically the information dropout level.

One possible method of improving the system reliability and dropout level in information storage systems is the introduction of a certain amount of redundancy in stored information. It is then possible to use a "voting" system for correlating recorded data wherein information is read out only if it logically coincides with the same information stored at a duplicated location. This scheme tends to eliminate the effect of noise and the like. However, noise in the usual case is gaussian in distribution requiring logical output correlation, the noise frequently having a greater amplitude than the desired signal. This logic leads to relatively complex electronic logic circuitry.

I have discovered a greatly simplified system for improving dropout level and therefore system reliability in storage apparatus employing an optical storage medium. If, for example, a one-digit as recorded in the optical storage medium is arranged to produce a bright or "white" spot of light in the system output, and if a zero-digit produces no light output, it is possible to attain the advantage of redundant recording more simply. The analysis for dropout rate does not follow the laws for gaussian noise because it is impossible for noise in an optical medium to produce more light than a "white" one-digit, a one-digit deflecting almost all the light falling thereon. Correlation is then performed by means of optically superimposing redundant storage areas. Thus in a particular embodiment in accordance with the present invention, the same information is stored at several (e.g. five) storage locations, and these locations are imaged in superposition in the output system. A "bit" of information is accepted as present, for example, if the net brightness of light output produced exceeds one half of full brightness. Such a criterion reduces the dropout level to one in around $10^{14}$.

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

Figure 1:
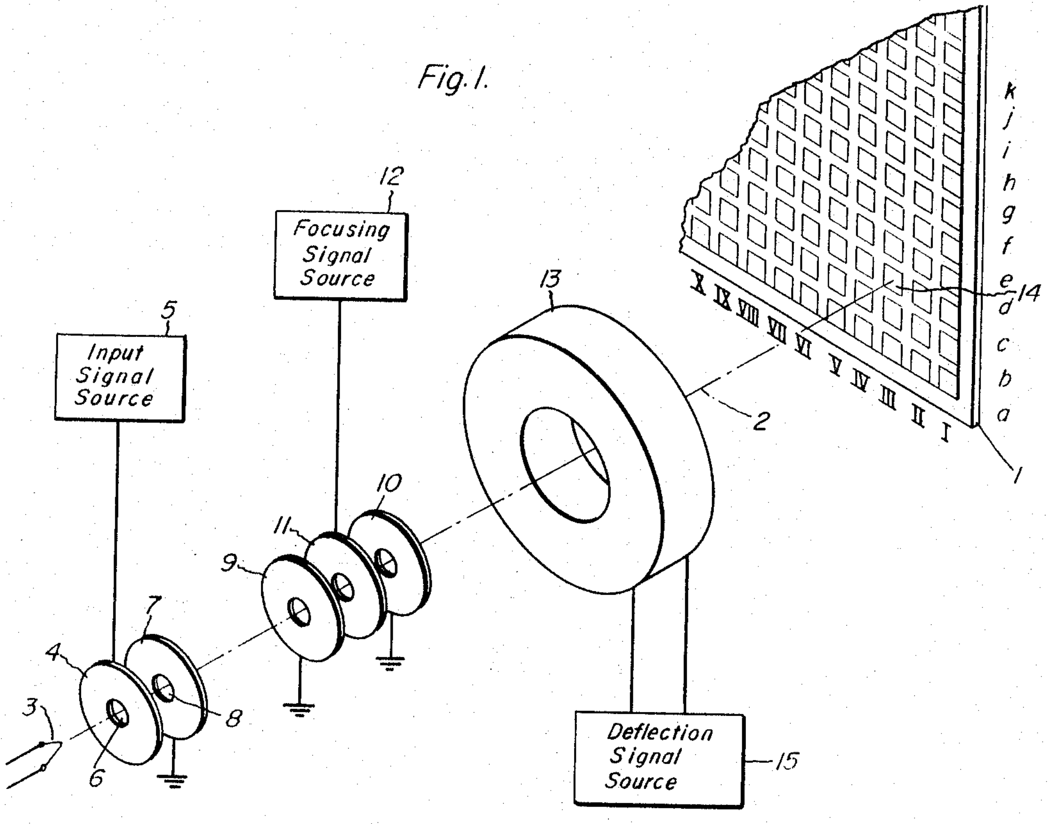
FIG. 1 is a perspective view of an electron beam writing apparatus for a memory system in accordance with the present invention.

Information is conveniently written into the memory system in accordance with the present invention employing the electron beam writing means of FIG. 1. In FIG. 1 an optical storage means, 1, in the form of a deformable medium is located to receive electrical charges from an electron beam 2. The source of the electron beam conveniently comprises components that are similar to those of a conventional cathode ray tube. This source includes a filament 3 which is heated by a source of electrical energy (not shown) connected across its terminals. Preferably filaments 3 is maintained at a large negative potential below ground with respect to other electrodes of the electron beam source. The beam of electrons emitted by filament 3 is controlled in magnitude by a potential supplied to control electrode 4 from an input signal potential source 5, the source of the digital information being recorded. When a one-digit input is present, signal source 5 controls electrode 4 such that the electron beam 2 deposits a charge upon medium 1. In the presence of a zero-digit, electron beam 2 is controlled to deposit no charge. Electrons passing through aperture 6 in electrode 4 are then accelerated because a difference in potential exists between filament 3 and anode 7 maintained at ground potential. The beam potential is equal to the difference potential between anode 7 and filament 3 and this difference is equal to the magnitude of the negative potential applied to filament 3. Anode 7 is provided with an aperture 8 larger than necessary for the passage of electrons. The electron beam is then focused by means of a system illustrated as an einzel lens comprising three circular electrode 9, 10 and 11. The center electrode, 11, is maintained at several kilovolts, preferably negative, from a focusing signal source 12 while the end electrodes 9 and 10 are grounded.

Deflection yoke 13 deflects electron beam 2 for "writing" a plurality of horizontal line rasters of electric charge upon optical medium 1, each raster line representing several recorded "bits" or digits of information. These rasters or blocks of information are shown greatly enlarged in FIG. 1 for ease of illustration. The rasters are disposed in columns denoted I, II, III, IV, etc., and rows *a*, *b*, *c*, *d*, etc. In the drawing, the beam is shown writing a raster 14 located in column III at row *c*. The deflection yoke 13 is energized by a deflection signal source 15 similar to deflection signal sources employed for television purposes whereby the individual rasters are written as successive horizontal lines. The deflection signal source may also be selectively biased to move the entire trace for writing one or more rasters such as raster 14 at various column and row locations upon optical medium 1. Also the medium 1 is desirably moveable physically in its own plane in accordance with the address location of the data block or raster being written by electron beam 2. Equipment for imparting motion to the optical medium, corresponding to a desired address, is described and claimed in the copending application of William C. Hughes, John E. Wolfe and William E. Glenn, Jr., Ser. No. 263,442, filed Mar. 7, 1963, now Patent No. 3,225,335, dated Dec. 21, 1965, a continuation-in-part of Hughes, Wolfe and Glenn, Jr. application Ser. No. 756,775, filed Aug. 25, 1958 (now abandoned) and equipment of this type is also described and claimed in the copending application of John E. Wolfe, William C. Hughes, Richard J. Rieke and Howard L. Lester, Ser. No. 822,931, filed June 25, 1959, now Patent No. 3,121,216, issued Feb. 11, 1964. All the aforementioned applications are assigned to the assignee of the present invention.

The region of optical medium 1 including means for generating the electron beam is evacuated when recording is being accomplished by the electron beam. When the beam has written the desired rasters under the control of input source 5, the medium 1 is heated by means not shown whereby the electric charge deposited on medium 1 acts to physically deform the medium in a manner hereinafter more fully described.

A preferred optical medium for utilization in the apparatus of FIG. 1 is a plate of the type described in the above mentioned patent application, Ser. No. 263,442, and more fully illustrated in FIG. 2. This plate comprises a deformable light modulating medium including an optically clear, structurally rigid base 16, such as glass, covered with a transparent conducting coating 17 that may be for example tin oxide. A transparent thermoplastic film layer 18 extends over coating 17. Thermoplastic layer 18 is also optically clear, having a substantially infinite room temperature viscosity and a relatively fluid viscosity at a temperature of 100–150° C., to which temperature it is heated during or after exposure to the electron beam 2 in FIG. 1. One satisfactory thermoplastic material is a blend of polystyrene, m-terephenyl and a copolymer of 95 weight percent of butadiene and five weight percent styrene. Specifically the composition may be 70 percent poly styrene, 28 percent m-terephenyl and 2 percent of the copolymer. The film thickness can vary from about 0.1 mil to several mils. This general method and apparatus of recording on this medium are described and claimed in my Patent 3,113,179 granted Dec. 3, 1963, and assigned to the assignee of the present invention. The medium is described and claimed in my application Ser. No. 84,424, filed Jan. 23, 1961, now Patent No. 3,147,062, granted Sept. 1, 1964, a division of the aforementioned Patent 3,113,179, and also assigned to the assignee of the present invention. Areas 19 in the thermoplastic surface layer are the electron charge rasters as deposited by electron beam in FIG. 1.

Figure 3:
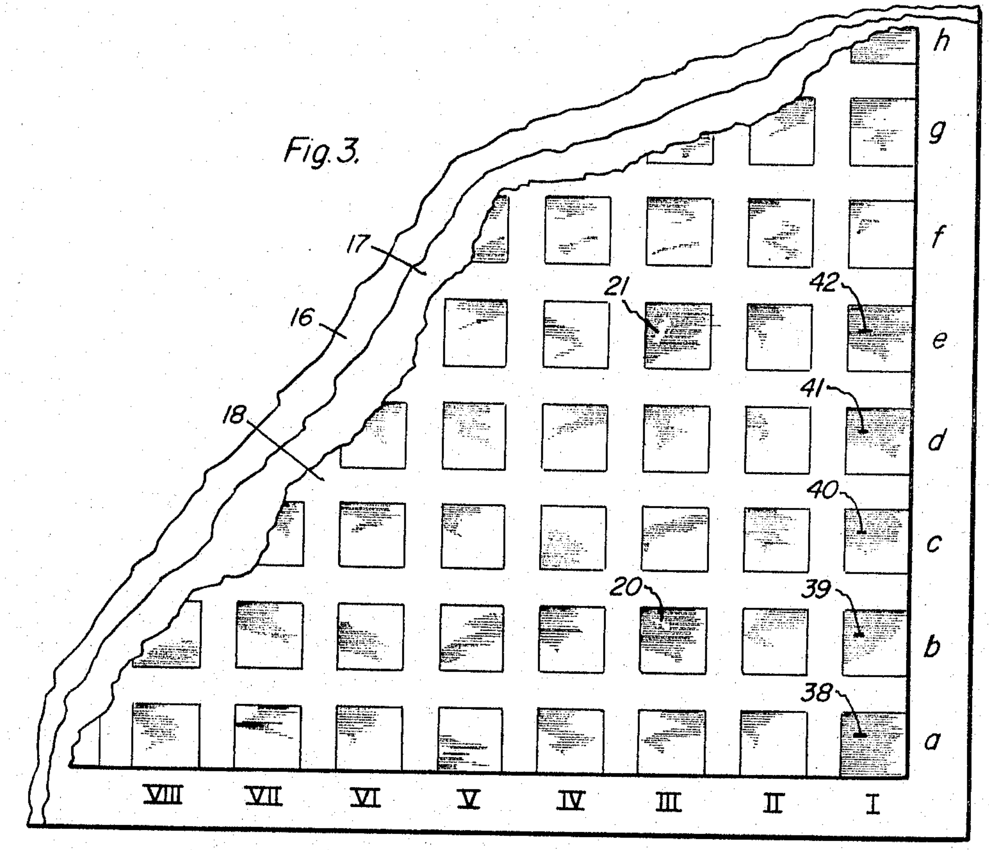
FIG. 3 is a plan view of the FIG. 2 optical medium illustrating the layout and placement of information in data blocks.
Figure 4:
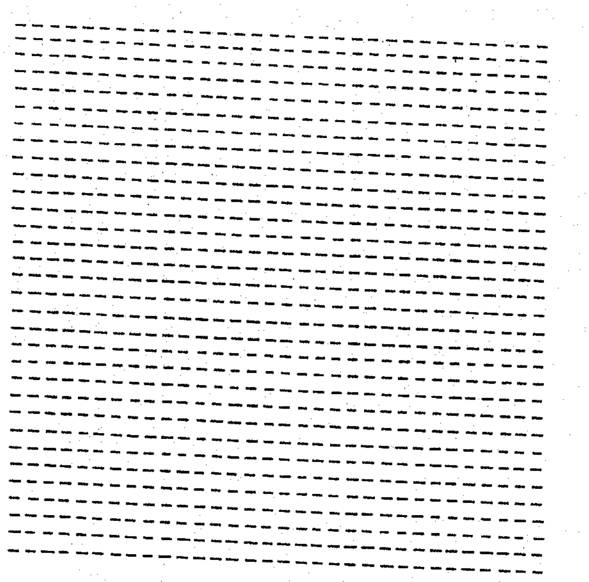
FIG. 4 is a further enlarged view of one such data block.

In FIG. 3 a number of these rasters are shown in greater detail, while in FIG. 4, one particular raster is illustrated. This raster conveniently includes 32 horizontal lines of charge with each line representing 32 recorded digits. It is seen each line is discontinuous or dashed, the dashes representing times when electron beam 2 is controlled by electrode 4 for selectively depositing electric charge representing a one-digit. For convenience of illustration, the raster is shown composed entirely of such one-digits, whereas in an actual recording of information, some of the dashes would be absent thereby representing zero-digits. It is possible to record 200 such rasters per linear inch on the optical medium 1 or 40,000 such rasters per square inch. With rasters 32×32 digits in size, nearly 50 million bits are recordable per square inch. Actually, in such recording, the bits of information written instead of being distinct dashes as shown in FIG. 4, will more nearly describe a checkerboard pattern wherein the lines of charge nearly adjoin one another.

After the information in the form of electrical charge is deposited upon the optical medium using the apparatus of FIG. 1, the medium is conveniently heated to a temperature somewhat in excess of 100° C., whereby the areas which have received electrical charge, representing one-digits, are drawn towards conducting layer 16, thereby forming one-digit depressions at each point where charge has been deposited. The depression in the thermoplastic layer 18 is capable of deflecting or diffracting light in read out means as hereinafter described wherein each such depression presents a light spot to the read out means.

In addition to intensity recording, other forms of deformation recording are possible employing a somewhat lower degree of information packing. For example, each digit may be recorded as a small multi-line diffraction grating. In this case recording and read out apparatus is employed as also described and claimed in my aforementioned application Ser. No. 783,558.

Figure 2:
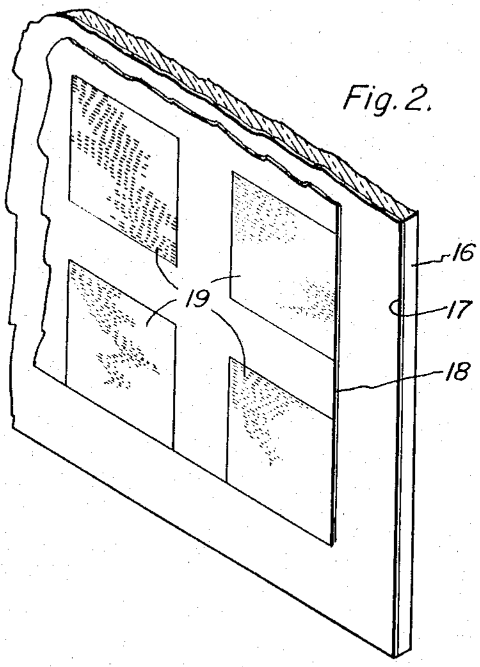
FIG. 2 is an enlarged view of a portion of an optical medium forming the recording medium in accordance with the present invention.
Figure 5:
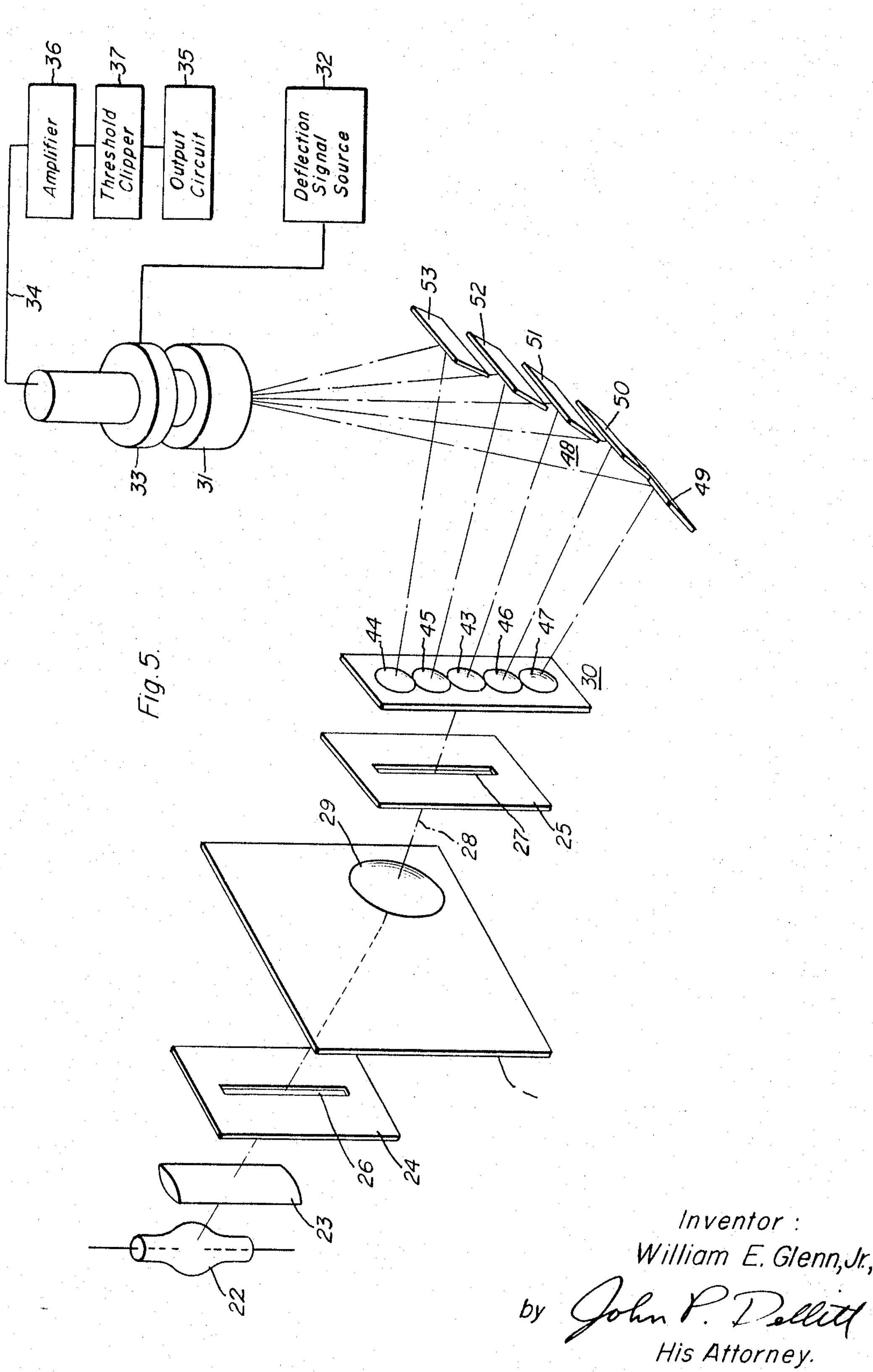
FIG. 5 is a perspective view of a read out system in accordance with the present invention.

A recorded pattern of the intensity type as illustrated in FIGS. 1–4 is read out using equipment illustrated in FIG. 5. Here, light from a light source 22, which may comprise a xenon arc lamp, is imaged by a cylindrical lens 23 upon a relatively small area of optical medium 1, for example, several rasters of recorded information in the same recorded column of optical medium 1. Optical medium 1 is positioned such that the light source illuminates the desired column whereby optical means hereinafter described may image out the desired rasters. The optical medium 1, in the form of a plate as shown in FIG. 2 may be positioned using equipment substantially as set forth and claimed in the aforementioned copending applications Ser. Nos. 263,442 and 822,931. Masking systems 24 and 25 having vertical slits 26 and 27 are placed, respectively, in the path of light from source 22. The slits may be quite long but their width is somewhat limited as hereinafter described. The path of light 28 extending from medium 1 is shown bent at an angle to light entering medium 1 from source 22, indicating the presence of a deformation in medium 1 capable of deflecting or diffracting the light passing through the medium. Masking systems 24 and 25 with their slits 26 and 27 are placed such that only deflected or diffracted light passes through slit 27 while the direct non-diffracted light strikes masking system 25 at a point substantially in line with source 22 and slit 26. Lens 29 effectively focuses the diffracted or deflected light upon slit 27 while focusing the direct light upon masking system 25. Therefore only light representing information recorded in medium 1 will pass through slot 27.

As hereinabove described, information recorded in optical medium 1 is in the form of blocks or rasters of light deflecting deformations. One or more such rasters are imaged by a lens system 30 upon the face of a television camera tube 31 via mirrors 49–53 of mirror system 48. Mirror 49 reflects the image produced by lens 47 on the face of tube 31, etc. The lens system 30 magnifies a raster or rasters so that an enlarged version thereof appears on the face of the camera tube. A deflection signal source 32 of the same type as deflection signal source 15 in FIG. 1, has its output coupled to deflection coil 33 of camera tube to provide television type scanning of the image presented to the camera tube. The scanning is in registry with the magnified image of the desired memory raster. Therefore, the camera tube output 34, coupled to output utilization circuit 35 through amplifier 36 and threshold clipper 37, consecutively represents one digit after another of the information as scanned from the memory raster.

Of course deflection signal source 32 may also be arranged to provide deflection voltages to deflection coils 33 for the purpose of reading out individual bits or digits at a selected digit position in the raster. At this time the deflection voltages applied to coils 33 are the same as those present in the raster scan as a given digit in the raster is reached. The scanning of camera tube 31 may be adjustably controlled to coincide accurately with a digit of optically presented data as set forth and claimed in the aforementioned applications Ser. Nos. 263,442 and 822,931.

In accordance with the present invention, increased reliability in reading the recording information is provided employing redundancy in recording and reading information. Such redundancy does not require a system of electronic logic circuitry for deciding when the same digit is repeated a plurality of times in the memory in the manner heretofore employed. Such logical circuitry has been required heretofore inasmuch as memory noise, e.g. unrecorded signals in the recording medium or the like, may indeed produce a greater output signal than a recorded "bit" of information. Then circuitry must decide, for example in a "voting" scheme, when properly stored information correlates with duplicated counterparts. In accordance with the present invention, advantage is taken of properties found to exist in the optical light modulating medium of the type described above. In the light modulating medium noise exists in the form of blemishes, scratches or the like in layer 18. These scratches or blemishes, being deformations in the medium, are capable of generating noise since such a scratch or blemish constitutes a deformation capable of deflecting light presented thereto. Therefore, such a blemish may cause a signal to be read out when no signal is in fact present. Two such blemishes are illustrated at 20 and 21 respectively located in rasters III*b*, and III*e* in FIG. 3.

However, such a noise generating blemish is capable of deflecting no more light to the output system for a given digit position than if the digit itself were in fact present. In accordance with the present invention, a raster block of data is recorded a plurality of times upon the optical medium. For example the same raster is recorded at five different locations in the optical medium employing the electron writing system of FIG. 1. Such raster may be conveniently repeated consecutively in the same column, for example, in positions I*a*, I*b*, I*c*, I*d* and I*e* in FIG. 3. A given bit of information is repeated in these rasters as a light deforming deformation for example at points 38, 39, 40, 41, and 42. Noise should have no correlation between locations storing the same information. That is an individual noise blemish should not be large enough under the circumstances encountered to reach the same information recorded at different locations. Now returning to FIG. 5, let us assume optical medium plate 1 is positioned so that central lens 43 of lens system 30 images raster I*c* upon the face of camera tube 31. Then lenses 44, 45, 46 and 47 arranged in a vertical row in the same lens system are positioned to image rasters I*e*, I*d*, I*b*, and I*a*, respectively, in superposition with raster I*c* upon the face of camera tube 31. All such rasters are superimposed upon the face of the camera tube using appropriate reflection angles for mirrors 49–53. Then the image on the face of camera tube 31 will be equal in brightness to the sum of the images of the five rasters I*a* through I*e*. That is, the resultant raster is five times as bright as the image of one raster from one of the separate memory locations. A digit is then accepted as present if the light exceeds a predetermined threshold.

A noise blemish such as blemish 21, if located in column I at the same location as a particular bit position being read, for example, position 42, can cause no more light to be focused on the camera tube in this bit position than if a one-digit bit 42 were in fact present as a deformation. When bit 42, and identical bits 38–41, are absent, such blemish will cause only one-fifth of the light to be present at this bit position on the face of camera tube 31. Even if another blemish is present in the series of rasters containing the same intelligence, for example, if blemish 20 were also present at bit position 39 in raster I*b*, only two-fifths of the maximum light would be focused on the face of camera tube 31 at the corresponding bit position. Of course, the coincidence of blemishes in this manner is unlikely but the circuitry connected to the output 34 of camera tube 31 and specifically threshold clipper 37 is adjusted to pass only a signal in excess of the predetermined magnitude. Thus, threshold clipper 37 may be adjusted to pass only signals in excess of one-half the maximum light attainable for a digit position from camera tube 31. Then, it is extremely unlikely the output signal will represent anything but the recording of a genuine digit. In fact, the dropout level is reduced from approximately 1 in $10^5$ to approximately 1 in $10^{14}$, in accordance with the present invention.

It should be recognized that alternative constructions are possible for superimposing the images of a plurality of rasters for a common output. Lenses 43–47 of lens system 30 need not be necessarily disposed in a vertical row for imaging respective rasters I*a*–I*e* upon the face of the camera tube. Likewise, the rasters themselves need not be disposed in a vertical row or even in a consecutive manner but can be widely spaced in the memory medium. Also, the same information does not have to be separately located in raster units, but may be separately located as lines or as individual digits. Of course five separate locations are not specifically required but the number may be greater or less than five. Also threshold clipper 37 can be set at levels more or less than one-half maximum level as suits the noise present in the information medium being used.

Camera tube 31 may be alternatively of the type having long image retention characteristics, that is a memory type tube. Then, the separate rasters, e.g. rasters I*a* through I*e* in FIG. 3, can be consecutively imaged upon the face of camera tube 31 with the camera tube remembering them long enough to attain the desired superimposed image effect. In this instance, the optical medium 1 may be moved intermittently to the five separate positions, with light source 22 pulsed as the medium 1 reaches the correct position for imaging a given raster on camera tube 31.

The system in accordance with the present invention allows a high degree of information packing without loss reliability through dropout due to noise. The redundancy in recording information at separate locations in the recording medium, although requiring more space, is made up for by the reliability and high information packing attainable in the medium. An increased reliability or reduced dropout level is attained, not as a result of complex electronic circuitry, but rather by simplified optical means wherein multiple images of the same intelligence stored at separately located deformations in the storage medium are superimposed providing their own "voting" system at the memory output device.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. An information storage system comprising an optical medium for storing intelligence including a multiplicity of light controlling areas wherein each such area represents a bit of information stored, means for recording the same intelligence at separately located regions in said optical medium, and means for reading out the intelligence thus recorded comprising light means for illuminating said optical medium, and optical means for imaging same intelligence recorded at the said separate regions of said medium including means for optically superimposing the images thereof to form a common image whose intensity is proportional to the coincidence of the intelligence from said separate regions rather than to noise present in said medium.

2. An information storage system comprising a deformable light modulating medium, writing apparatus for impressing charge on the light modulating medium representative of intelligence for storage upon said medium in patterns to form light deviating deformations in said medium having a parameter varying in accordance with the variations in intelligence to be stored wherein the same intelligence is stored as deformations at a plurality of separate locations in said medium, and means for reading out the intelligence thus recorded comprising light means for illuminating said optical medium, and optical means imaging said same intelligence recorded at the said separate locations of said medium and including means for optically superimposing the images of said intelligence to form a common image which is proportional in intensity to the coincidence of the intelligence from the said separate regions rather than noise present in said medium.

3. An information storage system comprising a light modulating medium for storing intelligence, an electron beam writing apparatus for impressing an electron beam on said light modulating medium to produce light deflecting deformations therein whose amplitude is indicative of the intelligence being stored wherein separate deformations are produced by said electron beam for each bit of intelligence stored, said modulating medium containing the same intelligence as deformations at a plurality of separate locations on said modulating medium, and readout means responsive to said deformations comprising a light source for illuminating said deformations, a light responsive output means in the path of light deviated by said deformations for receiving the image thereof and converting the same into electrical output signals, masking means between said light source and said output means for masking light not deviated by said deformations, means for imaging light representing the said same intelligence from said separate locations to form a common superimposed image at said output means, the intensity of which is proportional to the coincidence of the intelligence from said separate regions rather than to noise present in said medium, and means for providing electrical output only when the intensity of said superimposed images exceeds a value corresponding to an output from a predetermined number of said separate locations.

4. An information storage system comprising a light modulating medium for storing intelligence, an electron beam writing apparatus for impressing an electron beam on said light modulating medium to produce light deflecting deformations therein representative of the intelligence being stored wherein separate deformations are produced by said electron beam for each bit of intelligence stored, said modulating medium containing the same intelligence as deformations at a plurality of separate locations on said modulating medium, and readout means responsive to said deformations comprising a light source for illuminating said deformations, a light responsive output means in the path of light deviated by said deformations for receiving the image thereof and converting the same into electrical output signals, masking means between said light source and said output means for masking light not deviated by said deformations, and means for deflecting light corresponding to said same intelligence from said plurality of locations in superposition upon said output means to provide essentially a common image which is proportional to the coincidence of the intelligence from said separate regions rather than to noise present in said medium.

5. The system in accordance with claim 4 wherein said means for deflecting said intelligence from said plurality of locations comprises a plurality of lenses imaging said separate locations in said modulating medium in registration upon said output means.

6. The system according to claim 4 wherein said output means comprises a camera tube having long image retention characteristics.

7. An information storage system comprising a light modulating medium for storing intelligence, an electron beam writing apparatus for impressing an electron beam on said light modulating medium to produce light deflecting deformations therein representative of the intelligence being stored wherein separate deformations are produced by said electron beam for each bit of intelligence stored, said modulating medium containing the same intelligence as deformations at a plurality of separate locations on said modulating medium, and readout means responsive to said deformations comprising a light source for illuminating said deformations, a camera tube having long image retention characteristics providing a light responsive output means in the path of light deviated by said deformations for receiving the image thereof and converting the same into electrical output signals, masking means between said light source and said output means for masking light not deviated by said deformations, and means for deflecting light corresponding to said same intelligence comprising means for consecutively imaging said separate locations of said modulating medium containing said same intelligence upon said camera tube to provide essentially a common image which is proportional in intensity to the coincidence of the intelligence from said separate regions rather than to noise present in said medium.

References Cited

UNITED STATES PATENTS

| | | | |
|---|---|---|---|
| 2,628,346 | 2/1953 | Burkhart | 340—174.1 |
| 2,813,259 | 11/1957 | Burkhart | 340—174.1 |
| 2,934,995 | 5/1960 | Riesenberg | 88—74 |
| 3,113,179 | 12/1963 | Glenn | 340—173 |
| 3,161,885 | 12/1964 | Corcoran | 88—1 |

BERNARD KONICK, *Primary Examiner.*

J. BREIMAYER, *Assistant Examiner.*